Feb. 16, 1971   R. PITTMAN   3,564,402
APPARATUS FOR MEASURING THE STRENGTH AND DIRECTION OF
MAGNETIC FIELDS UTILIZING A PIEZOELECTRIC CRYSTAL
Filed Jan. 31, 1969   3 Sheets-Sheet 1
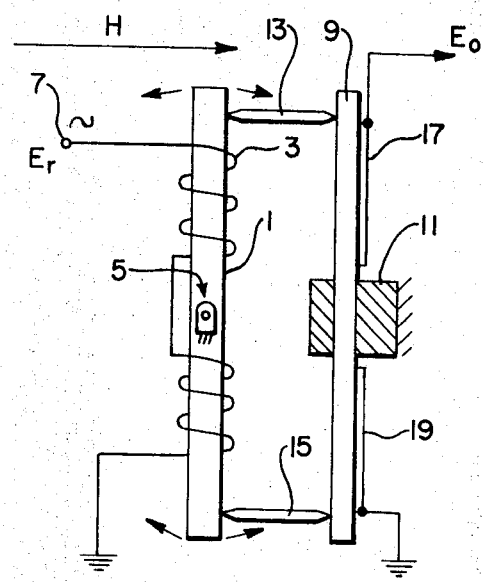
FIG. 1
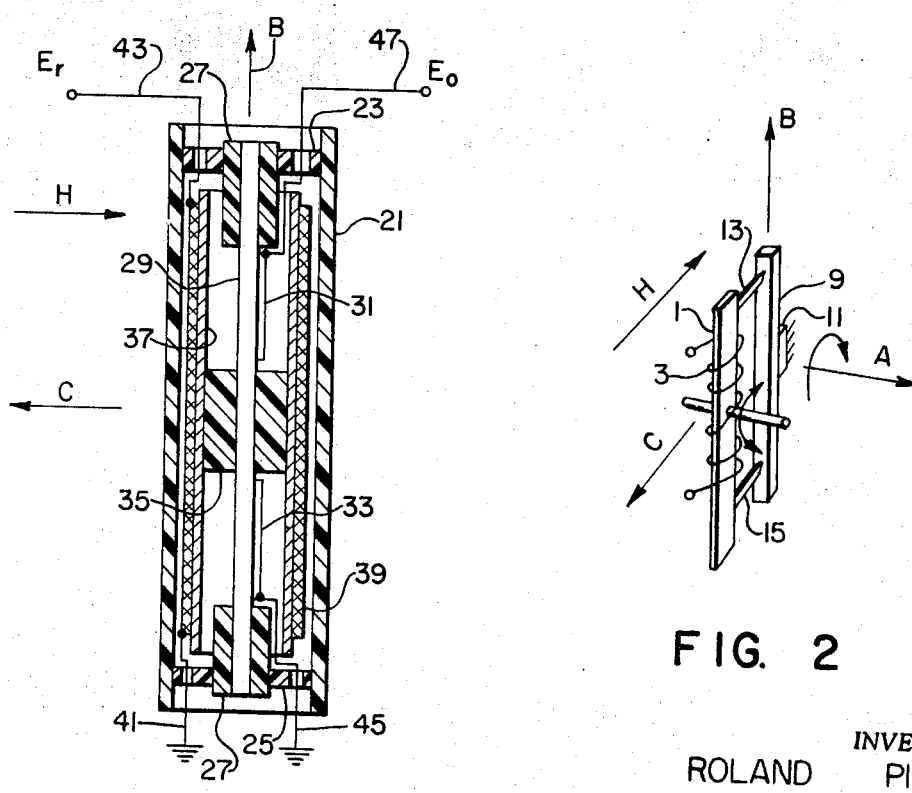
FIG. 3
FIG. 2
INVENTOR.
ROLAND PITTMAN
BY
Kenway, Jenney &
Hildreth,
ATTORNEYS

INVENTOR.
ROLAND PITTMAN

BY *Kenway, Jenney & Hildreth*

ATTORNEYS

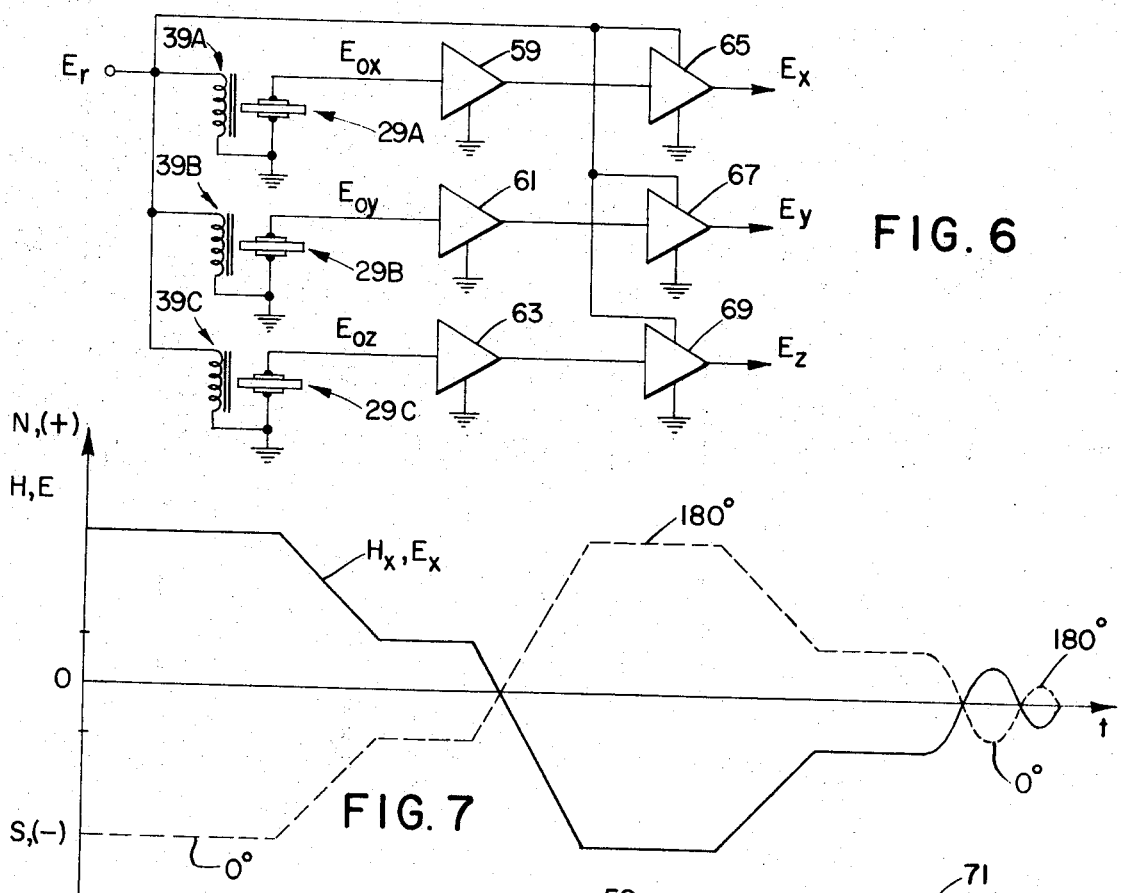
FIG. 6
FIG. 7
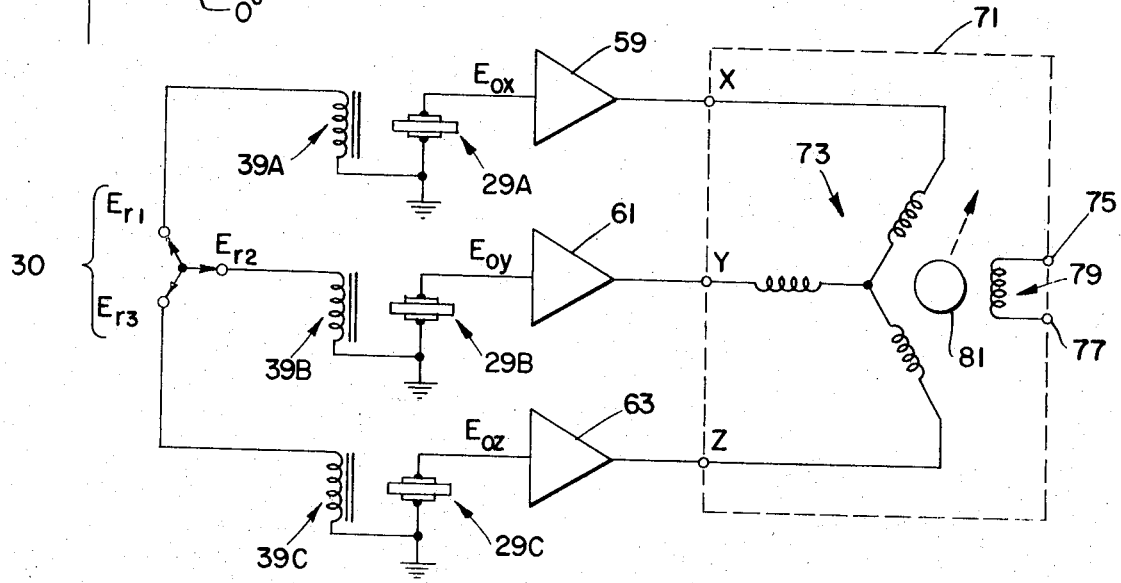
FIG. 8
INVENTOR.
ROLAND PITTMAN

United States Patent Office 3,564,402
Patented Feb. 16, 1971

3,564,402
APPARATUS FOR MEASURING THE STRENGTH AND DIRECTION OF MAGNETIC FIELDS UTILIZING A PIEZOELECTRIC CRYSTAL
Roland Pittman, Walpole, Mass., assignor to Northrop Corporation, Palos Verdes, Calif., a corporation of California
Filed Jan. 31, 1969, Ser. No. 795,598
Int. Cl. G01r 33/02
U.S. Cl. 324—43                                     7 Claims

ABSTRACT OF THE DISCLOSURE

A multiple axis field sensor incorporating for each axis a piezoelectric crystal acting as a spring restraining an electromagnet excited by a reference voltage against rotation in response to an external field, and circuit means controlled by the output of each crystal for producing a field strength signal.

---

My invention relates to field sensing, and particularly to novel apparatus for measuring the strength and direction of a magnetic field.

For many purposes, it is necessary to measure a magnetic field vector; for example, to determine and map the earth's magnetic field, to determine the local field produced by electrical apparatus, or for use in navigational and guidance equipment. Apparatus commonly used for the purpose has associated with it one or more local electrostatic or electromagnetic field suorces with which it may be difficult to avoid contaminating the measurement, particularly in the vicinity of a null. It is the object of my invention to facilitate the precise and rapid measurement of electromagnetic fields.

Briefly, the above and other objects of my invention are attained by a flux sensor in which a wound ferromagnetic core is restrained against oscillation by a piezoelectric crystal and excited by a reference source of alternating voltage. In the presence of a field vector having a component normal to the winding, the wound core will attempt to oscillate, applying oscillating torque to the restraining crystal. In response to the applied torque, the crystal will produce an electrical output signal having an amplitude proportional to the strength of the field to be measured, and being either in phase or out of phase with the reference source in dependence on the sense of the measured field component. By connecting the crystal output to a phase sensitive detector, a DC voltage can be produced which has a magnitude directly proportional to the strength of the field and a polarity determined by its direction. By that arrangement, its is possible to secure unusually complete decoupling of electromagnetic and electrostatic fields other than the field to be measured. The result is a very low null uncertainty when the measured field approaches zero. By combining three flux sensors in accordance with my invention with their sensitive axes in a mutually orthogonal relationship, the sense and magnitude of a randomly oriented field vector can be completely determined.

The manner in which I prefer to construct the apparatus of my invention, and its mode of operation, will best be understood in the light of the following detailed description, together with the accompanying drawings, of various embodiments of my invention.

In the drawings:

FIG. 1 is a schematic elevational view of a magnetic field sensor in accordance with my invention;

FIG. 2 is a schematic orthogonal sketch of the apparatus of FIG. 1;

FIG. 3 is a schematic elevational view, with parts shown in cross-section, of a flux sensor in accordance with a modification of my invention;

FIG. 6 is a schematic wiring diagram of a three axis flux sensing circuit in accordance with my invention;

FIG. 7 is a graph of field strength and voltage as functions of time, illustrating the operation of the apparatus of my invention; and FGI. 8 is a schematic wiring diagram of a flux controlled synchro in accordance with my invention.

Figure 4:
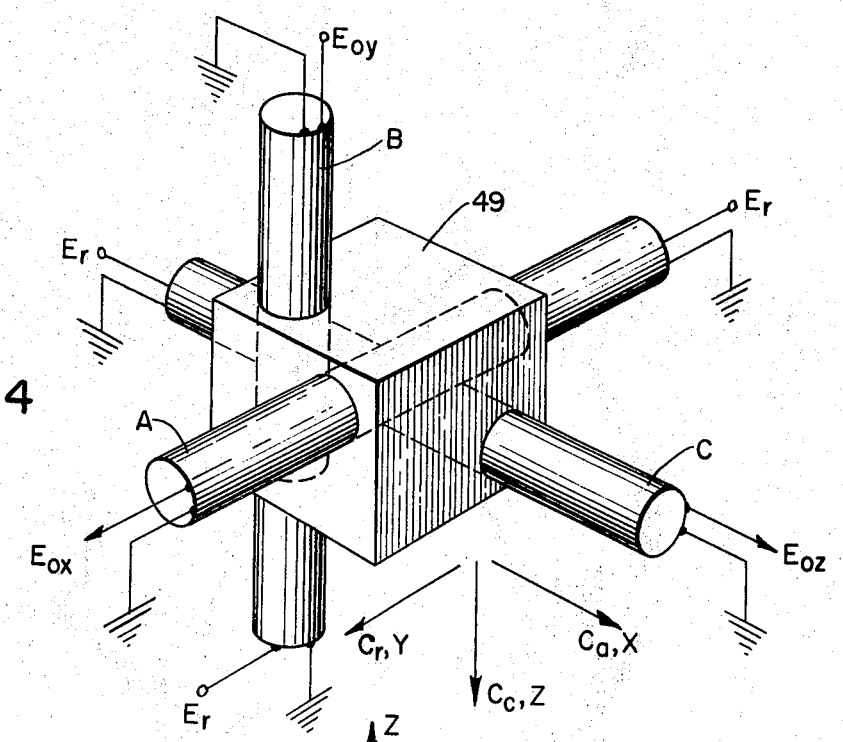
FIG. 4 is a schematic orthogonal sketch of a three axis flux sensor in accordance with one embodiment of my invention.

Referring first to FIGS. 1 and 2, I have shown apparatus for measuring a magnetic field having a component H in the plane of the drawing. The measuring apparatus comprises a core 1 of ferromagnetic materials, preferably ferrite material or the like. On the core 1 is disposed a winding 3. The upper and lower halves of the winding 3 are in series aiding relationship. The core 1 is pivoted to a suitable support, as indicated at 5.

The winding 3 is arranged to be excited by alternating reference voltage $E_r$ of constant amplitude applied between an input terminal 7 and ground. When so energized, and in the presence of the magnetic field component H, the core 1 will alternately attempt to rotate clockwise and counter-clockwise on succeeding half cycles of the reference voltage.

The wound core 1 is resiliently restrained against rotation beyond a few minutes of arc by a piezoelectric crystal 9 mounted on a suitable support 11 and connected to the core 1 by a pair of intermediate pins 13 and 15. The length of the pins 13 and 15 is such that in the null position of the core 1, there is a slight force exerted against both the top and bottom of the core 1. When, under the influence of the sensed and reference fields, the core 1 tends to rotate clockwise in FIG. 1, the force transmitted by the pin 13 is increased and the force on the pin 15 is decreased. On the next succeeding half cycle, those conditions will be reversed. An output voltage $E_0$ will accordingly be producing across the electrodes 17 and 19 of the crystal 9 that will have an amplitude proportional to the magnitude of the external field H. This voltage will be either in phase, or 180° out of phase, with the input voltage in dependence on the direction of the external field component H. For example, if the output voltage was in phase with the reference voltage when the vector H had the direction shown in FIG. 1, it would be out of phase when the vector H was in the opposite direction.

FIG. 2 shows certain directional characteristics of the apparatus of FIG. 1. The reference magnetic structure tends to apply torque to the crystal 9 about an axis. A. The longitudinal axis B of the crystal is a straight line normal to the axis A in the null position of the crystal and never departs substantially from that relationship. The axes A and B determine an axis C, normal to both the axes A and B, along which the measured field vector H will be sensed. Field components not parallel to the axis C will have substantially no effect on the output signal from the crystal.

FIG. 3 shows a modified flux sensor in accordance with a second embodiment of my invention. The apparauts comprises a cylindrical outer case 21, of nonconducting material. Disposed within the case 21 are a pair of end caps 23 and 25, and secured to each end cap is a cylindrical spacer 27 of insulating material.

Within the spacers 27 are mounted the ends of an elongated rectangular piezoelectric crystal 29 provided with electrodes 31 and 33. An insulating support block 35 mechanically connects the crystal 29 to a cylindrical ferrite core 37 on which is wound an electromagnetic coil 39.

One end of the coil 39 is connected to ground, by a lead 41 extending out through the end cap 25, the other end is connected to the source terminal at the potential $E_r$ by means of lead 43 extending out through the end cap 23. The electrode 33 of the crystal 29 is connected to ground by a lead 45 extending through the end cap 25, and the electrode 31 is connected to the terminal on which the voltage $E_0$ appears by a lead 47 extending through the end cap 23. If desired, the leads protruding through the end caps may be sealed by the end caps; open ports through the end caps have been shown simply for clarity of illustration.

The axes corresponding to the axes B and C in the apparatus of FIG. 2 have been shown in FIG. 3 for that modification of the apparatus. It will be understood that the corresponding axis A is normal to the plane of the drawing.

In operation, when an alternating reference voltage $E_r$ is applied between the lead 43 and ground, and in the presence of a field component H, the core 37 will attempt to oscillate and will thereby apply torque to the crystal 29 through the intermediate support 35 to produce an output voltage $E_0$ of the same character as that produced by the apparatus in FIGS. 1 and 2.

FIG. 4 shows apparatus for sensing three orthogonal components of an external field vector H that is arbitrarily oriented. As illustrated, the apparatus essentially comprises three orthogonally disposing sensing elements A, B and C mounted in fixed relationship by any suitable means here shown as a block 49 of insulating material. The sensors A, B and C may each be of the construction shown in FIG. 3.

The sensitive axes $C_a$, $C_b$ and $C_c$ of the sensing elements A, B and C are aligned with the coordinate axes X, Y and Z along which the components of the external field vector are to be measured. Each sensing element may be supplied with the same reference voltage $E_r$. The output voltages $E_{0x}$, $E_{0y}$ and $E_{0z}$ will have amplitudes proportional to the amplitudes of the corresponding flux vector components, and polarities relative to the reference voltage that depend on the senses of the external flux vector components.

It will be apparent that in the construction of FIG. 4, the origins of the sensing axes are not exactly coincident. For some purposes that do not matter, as where the space gradient of the flux vector is small with respect to the offset, or where a record of the position in space of the sensor is available so that a coordinate transformation can be applied. Where it is important that the origins of the sensing axes be coincident both in space and time, the modification shown in FIG. 5 and next to be described may be employed.

Figure 5:
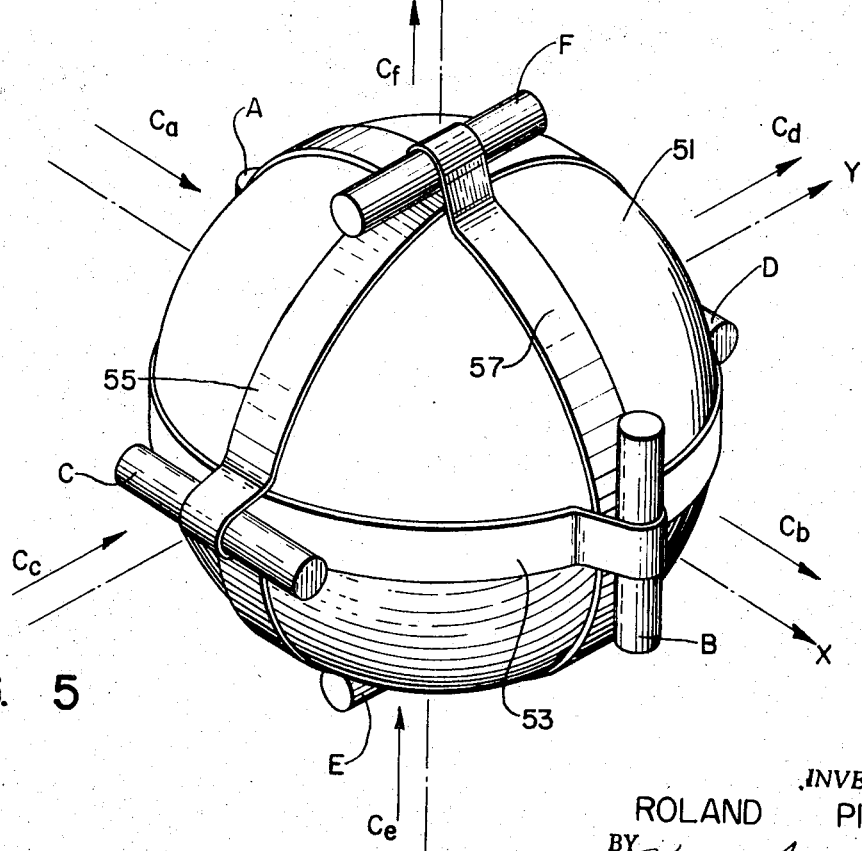
FIG. 5 is a schematic orthogonal sketch of a balanced three axis flux sensor in accordance with another embodiment of my invention.

FIG. 5 shows a three axis sensor in which six of the sensors of FIG. 3 are disposed about and mounted on a dielectric sphere 51. A first pair of sensors A and B are disposed on opposite sides of the sphere with their sensitive axes $C_a$ and $C_b$ parallel and in phase. That is, when the output signal from the sensor A is in phase with its reference, the output signal from the sensor B will be in phase with its reference. This relationship can be obtained by connecting the output circuits from the sensors A and B in series aiding relationship.

The sensors A and B may be fixed in position by means of a strap 53, of glass cloth filled with epoxy resin or the like, so that the desired parallel relation of the sensors may be maintained. In a similar manner, sensors C and D are secured to the sphere with a strap 55 so that their sensitive axes $C_c$ and $C_d$ are parallel with the axis Y. A pair of sensors E and F are connected to the sphere by a strap 57 in such a manner that their sensitive axes $C_e$ and $C_f$ are parallel with the Z axis. The output circuits of the sensors C and D are connected in series aiding relationship and the output circuits of the sensors E and F are connecting in series aiding relationship. It will be apparent to those skilled in the art that with this arrangement, the mutually orthogonal axes X, Y and Z along which the components of the external field vector are measured will have a common origin at the center of the sphere 51. The measurement made by any associated pair of sensors such as A and B will of course be the sum, and thus proportional to the average, of the measurements made by each of the pair.

FIG. 6 shows a circuit for producting DC output voltages proportional to the coordinates of a flux vector as sensed by the apparatus of either FIG. 4 or FIG. 5. For use with the apparatus of FIG. 5, the paired sensors would be connected in series as described above. For simplicity, the apparatus of FIG. 6 will be described only in connection with the specific apparatus of FIG. 4, as the modifications for use with the apparauts of FIG. 5 will be obvious. Where convenient, the reference characters of FIG. 3 are coupled with suffixes adopted from FIG. 4 to facilitate comparison of the figures.

The crystals 29A, 29B and 29C of the sensors A, B and C in FIG. 4, and the associated coils 39A, 39B and 39C, are shown schematically in FIG. 6. As shown, each of the coils is connected between ground and a terminal on which the alternating reference voltage $E_r$ is applied. The output voltages $E_{0x}$, $E_{0y}$ and $E_{0z}$ are connected through isolating amplifiers 59, 61 and 63 to phase sensitive detectors 65, 67 and 69, respectively. The isolating amplifiers may be of any conventional construction. The phase sensitive detectors are controlled by the reference voltage $E_r$ and by the input signals 59, 61 and 63 in a conventional manner to produce DC output signals $E_x$, $E_y$ and $E_z$ having a polarity dependent on whether the voltage such as $E_{0y}$ is in phase or 180° out of phase with the reference voltage $E_r$ and an amplitude depending on the magnitude of the component $H_x$, $H_y$ or $H_z$ of the sensed field vector H.

FIG. 7 shows the relationship between the X axis component $H_x$ of a flux vector and the AC and DC voltages produced in the circuit of FIG. 6. The solid line represents the flux vector $H_x$ as it is varied in a somewhat arbitrary way. The output voltage $E_x$ has the same waveform as the flux component and changes polarity when the flux component changes sign. The voltage $E_{0x}$ produced by the sensor A is an alternating voltage of the frequency of the voltage $E_r$ and having an envelope bounded by the solid curve and the corresponding dotted curve. It is assumed that when the flux vector is above zero the voltage $E_{0x}$ is in phase with the reference, and than when the flux vector is below zero the voltage $E_{0x}$ will be 180° out of phase with the reference.

FIG. 8 shows apparatus for positioning the shaft of a synchro in response to the output of a three axis sensor of the type shown in FIG. 4. It will be understood by those skilled in the art that certain conventional modifications may be made in the circuit to be described which, for expository convenience, is shown having certain attributes that are subject to arbitrary variation. Specifically, the circuit shown requires a 3-phase reference source, but does not necessarily require the Y connected source with grounded neutral implied in the drawing. The essential relation is that the three coils 39A, 39B and 39C be supplied with three alternating reference voltages $E_{r1}$, $E_{r2}$ and $E_{r3}$ of the same frequency, for example, 400 cycles per second; the same amplitude, and mutually 120° out of phase. The output signals $E_{0x}$, $E_{0y}$ and $E_{0z}$ are connected to the isolation amplifiers 59, 61 and 63 as in the apparatus of FIG. 6. The output signals from the amplifiers 59, 61 and 63 are connected to the three input terminals X, Y and Z of a conventional synchro 71. The terminals X, Y and Z are connected to the three terminals of the three phase winding 73 of the synchro. A reference alternating voltage, at the same frequency as the three phase source, and of constant amplitude, may be applied to the terminals 75 and 77 of the single phase winding 79 of the synchro. The rotor 81 of the synchro will thereby assume an output shaft angle determined by the magnitude and direction of the external field vector.

While I have described my invention with respect to the details of various particular embodiments thereof, many changes and variations will be apparent to those skilled in the art upon reading my description, and such can obviously be made without departing from the scope of my invention.

Having thus described my invention, what I claim is:

1. A magnetic flux sensor comprising, an electromagnet having an annular cylindrical electromagnetic core having a first longitudinal axis and a winding disposed about said core, a piezoelectric crystal having a pair of output terminals, said crystal being disposed within said core and extending along said first axis, a block of insulating material also disposed within said core and connecting said crystal to said core intermediate the ends of said crystal and means connected to the ends of said crystal to resiliently restrain the electromagnet against oscillations about a second axis normal to said first axis.

2. The apparatus of claim 1, wherein said means connected to the ends of said crystal comprises a cylindrical housing of nonmagnetic material, said electromagnet and said crystal being disposed within said housing with clearance between said housing and said electromagnet, and means connecting the ends of said crystal to said housing.

3. In a sensor of magnetic fields along three axes, three of the combinations of claim 1, and means mounting the three electromagnet-crystal combinations in fixed relationship with the said three axes, each axis being normal to a different pair of the first and second axes recited, in mutually orthogonal relationship.

4. Apparatus for sensing the strength and direction of magnetic fields along three axes comprising the combination of claim 3, a source of alternating reference voltage, means connecting the three windings in parallel to said source of alternating reference voltage, and phase-sensitive detector means connected to the output terminals of each of said crystals and controlled by said reference voltage to produce output signals in the presence of an external magnetic field component along each of said axes and normal to the others of said axes, said output signal having a magnitide proportional to the magnitude of said component and a polarity determined by the sense of said component.

5. In a three axis field sensor, six of the combinations of claim 1, means mounting the said six combinations in mutually fixed relationship, a first and second of said combinations being spaced apart with their associated first axes parallel, their associated second axes parallel, and having a third common axis normal to all of their first and second axes intersecting those first and second axes at their intersections, a third and fourth of said combinations being spaced apart with their associated first axes parallel, their associated second axes parallel, and having a third common axis normal to all of the first and second axes associated with said third and fourth combinations and intersecting those first and second axes at their intersections, a fifth and sixth of said combinations being spaced apart with their associated first axes parallel, their second axes parallel, and having a third common axis normal to all of the first and second axes associated with said fifth and sixth combinations and intersecting those first and second axes at their intersections, all of said third axes being mutually orthogonal and having a common intersection, means connecting the output terminals of said first and second crystals in series, means connecting the windings associated with said first and second crystals in series, means connecting the output terminals of said third and fourth crystals in series, means connecting the windings associated with said third and fourth crystals in series, means connecting the output terminals of said fifth and sixth crystals in series, and means connecting the windings associated with said fifth and sixth crystals in series.

6. The apparatus of claim 5, further comprising a source of alternating reference voltage, means for applying said reference voltage in parallel to said series connected pairs of windings, three phase sensitive detectors each having input terminals connected to a different pair of said series connected crystal output terminals and being controlled by said reference voltage to produce an output signal having a magnitude proportional to the amplitude of the output voltage across the associated pair of crystal output terminals and a polarity determined by the phase of said output voltage relative to the phase of the source.

7. A shaft positioner comprising a synchro which includes a rotor adapted to be connected to a shaft to be positioned, said synchro further including a three-phase stator winding and a single phase rotor winding, three of the combination of claims 1, a three-phase source of alternating reference voltage, means for applying a different phase from said three-phase source to each of the windings of the three electromagnets, amplifying means connecting the output terminals of each of the three crystals to a different phase of said three-phase stator winding, a source of single-phase alternating reference voltage, means connecting said source of alternating single phase reference voltage to said single-phase winding, and means mounting said three combinations in a mutually fixed relationship in which the three axes, each normal to a different pair of the first and second axes associated with each combination, are in mutually orthogonal relationship.

References Cited
UNITED STATES PATENTS

| | | | |
|---|---|---|---|
| 2,331,617 | 10/1943 | Moore, Jr. | 324—43 |
| 2,370,194 | 2/1945 | Riggs | 33—204.44 |
| 2,958,819 | 11/1960 | Bregar | 324—43 |

FOREIGN PATENTS

| | | | |
|---|---|---|---|
| 144,829 | 8/1947 | Australia | 324—47 |
| 857,459 | 12/1960 | Great Britain | 324—43 |

RUDOLPH V. ROLINEC, Primary Examiner

R. J. CORCORAN, Assistant Examiner

U.S. Cl. X.R.

33—204.4; 310—8.5